Patented May 1, 1951

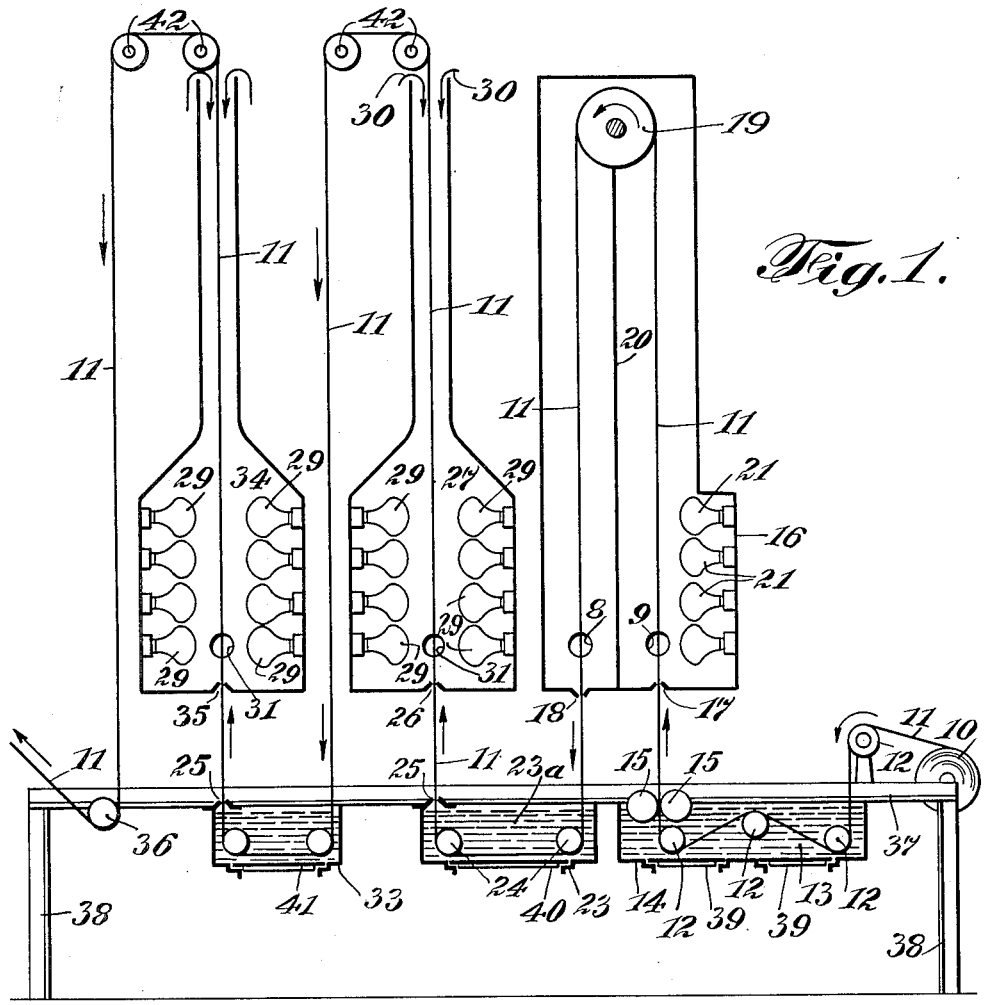
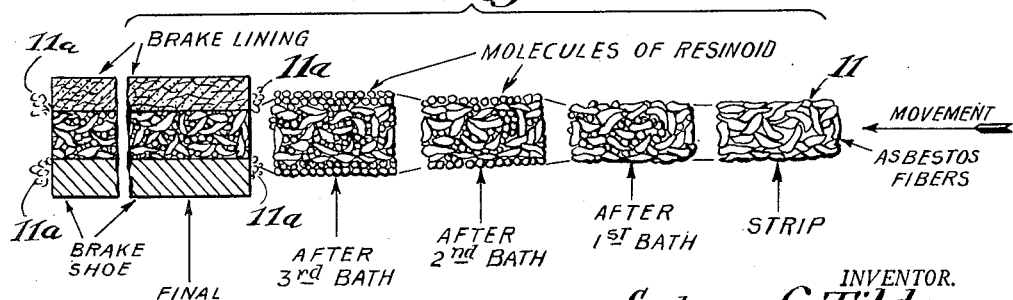

2,551,474

UNITED STATES PATENT OFFICE 2,551,474

BRAKE SHOE ASSEMBLY

Sydney G. Tilden, Stewart Manor, N. Y., assignor to The Permafuse Corp., a corporation of New York Original application May 10, 1946, Serial No. 668,662. Divided and this application November 3, 1947, Serial No. 783,702

1 Claim. (Cl. 188—251)

This invention relates to certain improvements in the means to attach friction material to brake shoes, brake bands and clutch plates.

The securing of one kind of material, as a brake lining, to another kind of material, as a brake shoe, by the adhesion of the securing means, in place of mechanical adjuncts like rivets, has been attempted to be solved by the application of a pasteform of adhesive respectively to the brake lining and to the shoe, for instance, and then joining the adjacent adhesive covered surfaces by heat and pressure. The objections thereto, induced another attempt in the form of an intermediate member of a brake lining composition, but of laminated character, with both sides covered with another composition as an adhesive, of which one adhesive side was intended to adhere to the brake lining and the other adhesive side to the brake shoe. The bond between the intermediate member and the brake shoe, or between the intermediate member and brake lining, was intended to be stronger than the cohesion of the intermediate member, so that the intermediate member was intended to be split and split portions were intended to adhere to the brake shoe, and other split portions to the brake lining on the removal of the brake lining when it was to be replaced. The failure of resisting tensile strains in the former attempt became juxtaposed to the failure of resisting shear stress in the latter attempt, so that while each attempt had some advantage over the other, the attendant objections were dominant, to the extent of failing in the solution of the underlying problem.

The present invention leaves these attempts on the side, and is based upon the conception of a three member joint action, in which each of these members is functionally co-equal, namely, the brake lining, the brake shoe, and the novel bonding member, which self-contained bonding member takes its equal place in this trinity instead of being subordinate, auxiliary, or accidental.

The embodiment of the invention presents a novel combination, an entity made to resist the highest tensile and shear strains under the highest temperatures attendant use, such that failure under the stresses and strains imposed by use, is not in the bonding member itself, but in the adhesive strength of the bonding member to the brake lining or to the brake shoe. The improved bonding member is a medium between the parts being joined, not something proceeding from such parts, or intended to become a part of such parts.

The improved bonding member is formed of a longitudinally and transversely homogeneous thermosetting resinoid mass to form a sheet of suitable thickness with asbestos fibers dispersed in every direction therein between the interstices of which columns of thermosetting resinoid extend from face to face of the sheet. The mass is unitary from surface to surface, that is the mass is of the same material throughout and forms an integral structure between the interstices of and around the asbestos fibers. The bonding member is a solid to be applied between the brake shoe and lining in a solid state. The asbestos fibers and the resinoid are substantially coextensive from the interior to the exterior surfaces of the bonding member, and the exterior surfaces of the resinoid have the capacity of adhesion to the applied member, as the brake lining or the brake shoe. Such an integer in the three part combination, overcomes the several objections of each of the attempts heretofore referred to.

Such a bonding member in which a skeleton asbestos web or sheet or strip having its fibers purposely disposed indiscriminately, in contrast to laminations, is thoroughly impregnated with a resinoid solution, and subjected to infra-red rays to dry the exposed surface of the resinoid, and then subjecting this so prepared impregnated sheet to a molecular resinoid building up procedure on the parallel upper and lower surfaces to homogeneously increase the thickness of the sheet, and then drying the accretions, whereby upon the volatiles of the accretions evaporating, the finished sheet has a homogeneous colloidal texture in which all parts of the resinoid are thoroughly intermingled with each other in the skeleton like resinoid structure filling the interstices of the asbestos fiber distribution and the cellular structure thereof. The equalizing impregnation from face to face of the strip by the solution of resinoid between the indiscriminately disposed asbestos fibers, assures a resistance to tensile strain, and the integral homogeneous mass which is free from laminations and which has fibers transversely disposed to the length of the sheet assures a resistance to shear strain. The asbestos fibers being indiscriminately disposed, do not form any possible split line, as might be the case were the fibers arranged parallel with the faces. The bonding member which is homogeneously solid, in distinction to a ply which is laminated and which may be split along pre-formed lines or planes.

The invention will be further described, embodiments shown in the drawings, and the invention will be finally pointed out in the claim.

In the accompanying drawings,

Fig. 1 is a diagrammatic drawing of the tanks, and drying apparatus used in carrying out the improved method of making the improved binder; and Fig. 2 is an enlarged diagrammatic view of the various stages in the making of the bonding member.

Similar characters of reference indicate corresponding parts throughout the various views.

Referring to the drawings, Fig. 1, a roll 10 of an asbestos strip, enables the strip 11 to be fed over rolls 12, through a bath 13 of impregnating resinoid solution in tank 14. The bath 13 of the tank 14 has a level slightly below the centers of two calendering rolls 15, which are preferably used, and which press the asbestos fibers and impregnating material of the bath together. The centerline of the calendering rolls, when used is set just above the level of the resinoid solution so that the lower or bottom portion of each of the rolls is immersed in the solution and the excess solution which is squeezed out is free to run back along the strip into the bath with no opportunity to air harden or dry on the strip. The rolls, by continuous dipping in or rotation in the solution, are kept wet and thus do not stick to the strip.

The first drying compartment 16 has an entrance 17 for the strip 11, and an exit 18 for the same. The strip 11 passes over an intermediate roller 19 at the top. A partition 20 extends downwardly below the roller 19. On one side of this partition 20, a plurality of infra-red drying lamps 21 are arranged to have the radiant heat of the same act to dry out the volatile solvents and, in the preferred form, to slightly advance the impregnated resinoid. Air is circulated through the compartment 16 entering through the intake port 9, becoming heated by the heat effects of the lamps 21 and of the surrounding metal parts of the compartment 16. The air passes up through the compartment at the right of the partition 20 and down at the left of the partition 20, and exhausts through the exhaust port 8, so that the strip 11 is subjected to the drying action of heated air throughout its entire trip through the drying compartment 16.

The strip 11 after leaving the exit 18 of the drying compartment 16 enters a second tank 23 having a bath of resinoid solution 23a, and the rollers 24 guide the strip 11 through the bath. Doctors 25 may be provided at the exit end of the strip from the bath 23a to control the thickness of the added material. The strip 11 then enters the entrance 26 of a second drying compartment 27, also having a plurality of infrared drying lamps 29. Air entrance openings 30 are provided at the upper end of the compartment 27, and an air discharge 31 is provided at the lower part of the compartment 27. The infra-red lamps 29 are arranged on both sides of the strip 11, to accelerate the drying action, but not to advance the resinoid, while cool air entering from the top of the compartment 27, at 30, and passing along the strip 11, serves to harden and set the resinoid before the strip 11 passes over the top rolls 42.

The time of immersion and temperature of the bath must be considered. As an example, an immersion time of 15 sec. in a bath 23a at 80° F. has given successful results. The temperature in the drying compartment 27 is maintained at about 100° F. and 2000 watts to 3000 watts if infra-red drying lights are used.

If desired, another tank 33 and compartment 34 having an entrance 35 may be added, operating in the same manner as the tank 23 and compartment 27, until the strip 11 in completed form finally passes over the discharge roller 36. The time and temperature is about the same as just stated.

The rollers 10 and 12 and the tanks 14, 23, and 33, as also the roller 36 are supported on the table 37 with standards 38. The guide rollers 42 and compartments 16, 27 and 34, are suitably supported (not shown) above the table 37. Electric strip heaters 39 on the impregnating tank 14, 40 on the tank 23, and 41 on the tank 33, are provided so that each of these solutions may be maintained at the optimum operating temperature.

The improved bonding member is formed from a sheet made from fibres of one kind of asbestos, namely chrysotile serpentine, chemically known as a hydrous magnesium silicate containing approximately 43% magnesium oxide (MgO), 44% silicon dioxide ($SiO_2$), and 13% water. Such fibres are quite flexible and may be fibrilated and intertwined in beaters and then matted into sheets. The asbestos sheets are those in which the fibers are arranged transverse to the longitudinal line of the strip with irregular transverse and longitudinal interstices between the fibers which permit ready and rapid filling by the resinoid, and impregnation by the resinoid of the fibrous structure, particularly by the preferred water soluble resinoid, so that the fibres are impregnated by the resinoid and the interstices between the fibres filled by the resinoid. The individual asbestos fibers indiscriminately disposed are encircled, permeated and bonded together by the surrounding resinoid in a transverse and longitudinal homogeneous structure. This is important in order to assure the uniformity of the solid. Upon completely reacting the resinoid under the heat and pressure applied to the brake shoe, bonding member and brake lining, the fibres are strongly bonded together by the adhesive action of the resinoid, and the resinoid forms an integral structure from face to face of the sheet. It is a solid from face to face. Under such heating the bond is not greatly weakened because of the known heat resisting attributes and consequent incombustibility of the chrysotile. Comparative shear tests to destruction of this improved bonding member show bonds between brake lining and brake shoe of 400 to 500 lbs. per sq. in. and only very slight reduction of shear strength after subjection to a temperature of 500° F. for 30 min.

In Figure 2, the progressive stages in the production of the bonding member from its initial stage as an asbestos sheet to the final stage ready to be applied between a brake shoe and brake lining is shown. The asbestos sheet first shown has a sizing (not shown). Following the direction of the arrow, the impregnation bath adds the resinoid. The second bath adds accretions to the surfaces. The third bath, if used, adds further accretions. When pressure and heat are applied, to assemble the brake shoe, bonding member and brake lining, the excess resinoid is squeezed out, as indicated by the bubbles 11a, so that the intervening bonding member is a concentrated composite of resinoid and asbestos. Some of the accretions are forced into the asbestos interstices, under the molding action of heat and pressure; that is, it is not intended that all the accretions of resinoid on the surface of the bonding member are squeezed out, but rather that they are forced into the mass of resinoid and become part thereof. Under the heat and pressure applied in its intended use, the resinoid particles become one mass.

A sheet of such asbestos fibres of a thickness between 0.007" and 0.025" which is commercially available in various grades has very little tensile or shear strength since the fibers have no fibrils or whiskers, such as cotton or wool fibers which intertwine and resist pulling apart. The heat resistance of asbestos presents advantages over cotton or wool. The interstitial spaces between the overlapping asbestos fibers in all directions, provide a network interstitial space through which the resinoid enters, to convert the low tensile and low shear strength of the sheet into a high tensile and high shear strength. By impregnating the spaces between the fibers with a phenol formaldehyde resinoid, the fibers become dispersed in the colloidial molecular resinoid, all parts of the fibers being surrounded. Any breaking of the fibers into smaller fragments in the presence of the enveloping resinoid, as by calendering rolls or restricted passages, causes the resinoid mass to enclose the smaller fragments. The entrained asbestos particles give strength to the dispersed medium, both in tensile and shear stress. In Fig. 2 of the drawings the resinoid particles have been shown diagrammatically by circles as representing the particles though to the sight the resinoid is a solid mass.

The bath solution is a solution of a phenol-formaldehyde resinoid containing 25% to 40% solids by weight to obtain a thorough impregnation as described, the time element and solution temperature being taken into consideration. As an example, an impregnation of about 45 sec. at a temperature of 80° F. has given good results.

The drying is carried out under infra-red drying lamps in the presence of an air stream warmed by the lamps and the intensity of heat is so controlled that the volatile solvents are evaporated and, in the preferred use, the resinoid is partially advanced so that the resinoid impregnation is not readily soluble in any additional resinoid solution when applied. By controlling the intensity of the heat of the drying lamps, the temperature of the air flow, and the speed at which the impregnated tape or strip passes the lamps, the degree of advancement of the resin may be controlled. As an example, 1125 watts of drying lamps (3—375 w. lamps), an inlet air temperature of 90° F., an outlet air temperature of 105° F., and a tape speed of 4 ft. per min., have given good results. It is desirable to advance the resinoid impregnation just enough to prevent too quick a solvent action of any further resinoid solution. If the resinoid impregnation is advanced too far, the strip becomes very brittle and is easily fractured in handling. If it is not advanced at all, the solvent action of any additional resinoid solution causes difficulties in drying.

On thinner asbestos paper strips of between 0.007" and 0.015" thickness, the use of calendering rolls is not essential, since thorough impregnation by simply passing the strip through the resinoid solution bath is possible. In this case, the use of a doctor consisting of rubber or steel wiping blades is sufficient to remove the excess resinoid from the surface as the strip is withdrawn from the bath.

In the bath, when the resinoid is in solution, molecular separation and particle suspension exists. When the volatiles are evaporated, the resinoid particles adhere to each other, forming a colloidal mass with the asbestos fibers dispersed therein. The advanced resinoid at the surface of this colloidal mass thus forms a partial impedance to the dissolving of the mass by the solvent of the additional resinoid applied thereto, while the volatile solvents still remain unevaporated, but nevertheless there is an accretion of the added molecules to the molecules of the first impregnation whereby homogeneity is obtained, upon the evaporation of the volatiles supplied by the subsequent resinoid. Furthermore, the drying by infra-red rays aided by air circulation of the added resinoid from the second bath, follows so closely upon application of the added resinoid that the volatile solvents do not have time to act on any part of the thickness except the surface thereof, since before they can penetrate too deeply, the solvents are evaporated and the accretion takes place.

If desired this subsequent process of adding to the thickness of the strip may be repeated, depending on the desired thickness of the strip. A plurality of thin applications rather than one thick coat has several advantages. It permits faster drying of the volatile solvents without advancement of the resinoid, since less heat is required to dry each of the thin applications. It permits the use of less viscous applications, and thus more ready drying. It provides an accretion of the molecular or colloidal resinoid, since the solvent dissolves the surface of the previously applied resinoid and enables a homogeneous merging, without stratification, upon the evaporation of the volatile solvent. Every bath application repeats the accretion process. When the desired thickness has been obtained, the bonding member is ready for use.

The speed of vertical movement of the strip out of both of the resinoid baths is related to the gravity drip or flow off of the excess resinoid and the temperature and viscosity of the bath solution must be controlled and co-ordinated with the vertical speed of the strip out of each of the baths to secure an even surface and eliminate "lace curtains." In other words, as the strip is withdrawn from the bath, the excess resinoid must run down the surfaces of the strip and back into the bath faster than the strip is withdrawn.

The height of the drying compartment and the length of the strip therein being dried also requires consideration, since if the height is too great, the strip will break under its own weight, and if the compartment is too short, the drying must be too intensified.

It is preferred to modify the impregnation solution by the addition, or the substitution, of an aqueous solution of a phenol-formaldehyde resinoid. The smaller molecular size of the water soluble resinoid permits faster and more complete impregnation of the asbestos fibres, and brings about the solubility of the size or glue used in the manufacture of the asbestos sheet. A solution containing four parts by volume of alcohol soluble resinoid containing 25% to 40% solids by weight, and one part by volume of water soluble resinoid containing 70% solids by weight, and one part by volume of denatured ethyl alcohol has given excellent impregnation having the wetting and saturating action necessary and the proper viscosity.

In certain cases, the addition of a plasticizer to the impregnating resinoid bath, or to the accretion bath, or to both, is preferred. The presence of such a plasticizer permits advancing the resinoid without the extreme brittleness sometimes obtained. The addition of 20% tricresyl phosphate (ortho free), 20% dibutyl phthalate, or 5% castor oil, all by weight, has given satisfaction. When a plasticizer is added, the action described is substantially the same, save that the presence of the plasticizer reduces the tendency to brittleness after all volatiles have been evaporated.

The sheet may be impressed during the calendering operation with depressions of diamond shape or the like in the exterior surfaces, to form reservoirs for the subsequent accretions of applied resinoid. By filling these depressions with the added resinoid, an anchorage is obtained, which enables also a heavier and thicker deposit to be made and resists any splitting action.

It is known to the prior art to use thermosetting resinoids as adhesives to be applied between and to secure brake linings to brake shoes, brake bands or clutch plates, the resinoid being reacted by heat while pressure between the two is applied. Such resinoids are generally in liquid form, being alcohol solutions, and the surfaces to be cemented together are usually painted or sprayed with the resinoid solution and the solvent allowed to dry before clamping together and reacting the resinoid with heat. This method, however, has the following disadvantages: (1) The solution is very sticky and difficult and unpleasant to handle. (2) The solution must be kept tightly covered when not in use to prevent evaporation of highly volatile solvents. (3) The thickness of resinoid must be left to the judgment of the mechanic applying the coating. (4) The treated brake shoe, brake band or clutch plate and the treated brake lining must be put aside to dry before being assembled and cemented together.

Intermediate members used in the past have consisted mainly of brake lining materials coated on each side with a layer of adhesive. Such intermediate members are impervious to impregnation by thermosetting resinoid. Thus the strength of the intermediate member between brake lining and brake shoe was limited by the internal mechanical weakness of the intermediate material. Such sheet packing material has a satisfactory shear strength of 250 to 300 lbs. per sq. in. at normal temperatures but upon subjection to temperatures of 500° to 600° F. as in practical use, for as little as 30 min. the shear strength dropped to below 100 lbs. per sq. in., which affords too small a factor of safety for brake and clutch operation, and failures have occurred. The lack of longitudinal and transverse homogeneity in the prior art structures subjected them to shear strain, splitting, etc.

Departing from the prior art, I have found that a bonding member produced by the improved method has certain desirable qualities lacking in previous materials produced and used. These are:

(a) A bonding member which will not split or shear, and by reason thereof is of far greater internal strength.

(b) A bonding member of uniform strength throughout its thickness.

(c) A bonding member which produces a bond between the friction material and the brake shoe, brake band or clutch plate which retains satisfactory shear strength after subjection to temperatures such as in practical use, of between 500° F. and 600° F. for 30 min.

(d) A bonding member which produces a bond between friction material and brake shoe, brake band or clutch plate, which is sufficiently flexible to permit flexing of the unit in use without fracture of the bond.

(e) The improved bonding member produced by this method, when used to bond friction material to brake shoes, brake bands and clutch facings, produces a stronger, more heat resistant and shear resisting bond than heretofore available.

These advantages follow from the action of the heat and pressure applied to the brake lining and brake shoe with the bonding member therebetween since the bonding member has a longitudinal and transverse homogeneous body of thermosetting resinoid from surface to surface, part of which resinoid, by such heat and pressure, enters the somewhat porous surface of the brake lining contiguous to the bonding member and makes the brake lining unitary with the bonding member while the other side of the bonding member has its resinoid adhere to the rough surface of the brake shoe. Thus, transverse columns of resinoid which are formed from surface to surface of the bonding member between the asbestos fibers, extend from the brake lining to the brake shoe, without any intermediary layer. It is these innumerable integral columns of thermosetting resinoid built between the asbestos fibers, which give strength to the bonding member.

The improved bonding member is preferably of a translucent character, almost transparent to the extent of being able to read printed matter beneath, and is self-contained and ready to apply. It is believed that this is the first bonding member having the characteristics herein set forth.

The matter herein described and not claimed forms the basis of other applications, Serial Number 783,704, filed November 3, 1947, and Serial Number 783,703, now Patent Number 2,542,064, February 20, 1951, this application being a divisional application of an application filed by me on May 10, 1946, under Serial No. 668,662.

I have described several forms of my invention, but obviously various changes may be made in the details disclosed without departing from the spirit of the invention as set out in the following claim.

I claim:

In a brake shoe assembly having a brake shoe with an exterior face, and an attached brake lining with an interior face, the combination with said faces, of a bonding member having upper and lower surfaces spaced .007 to .025 from each other disposed between said faces with its surfaces in direct faying relationship with said faces, forming the means of attachment between said lining and shoe, said bonding member consisting of asbestos fibers arranged in all different directions, spatially separated from each other laterally, longitudinally, and transversely, and embedded in and encased by, an integral mass of completely reacted thermosetting resinoid including transverse integral columns of resinoid in said transverse spatial separation of said fibers between said upper and lower surfaces extending from surface to surface, and said integral mass being distributed throughout the length and breadth of said surfaces, the said integral transverse columns having a direct adhesive contact with said faces and being a direct means of attachment of said lining to said shoe, said resinoid bonding said fibers together, whereby said three member joint action, provides a strength of attachment of said brake lining to said brake shoe in excess of 400 pounds per square inch after subjection to a temperature of between 500° F. and 600° F. for thirty minutes, tested in resistance to shear stress.

SYDNEY G. TILDEN.

REFERENCES CITED

The following references are of record in the file of this patent:

UNITED STATES PATENTS

| Number | Name | Date |
|---|---|---|
| 2,272,532 | Shriver | Feb. 10, 1942 |
| 2,293,914 | Nanfeldt | Aug. 25, 1942 |
| 2,406,653 | Batchelor | Aug. 27, 1946 |
| 2,428,654 | Collins | Oct. 7, 1947 |